United States Patent [19]

Saccani

[11] 4,398,627

[45] Aug. 16, 1983

[54] HIGH PRODUCTIVITY DEVICE FOR FEEDING CYLINDRICAL OBJECTS TO SILK-SCREEN PRINTING MACHINES

[75] Inventor: Remigio Saccani, Reggio Emilia, Italy

[73] Assignee: Officina Macchine Per Stampa Su Oggetti O.M.S.O. S.p.A., Reggio Emilia, Italy

[21] Appl. No.: 309,080

[22] Filed: Oct. 6, 1981

[30] Foreign application Priority Data Nov. 14, 1980.
[IT] Italy ........................................ 46904 A/80

[51] Int. Cl.³ ................................................ B65G 47/00

[52] U.S. Cl. .................................... 198/339; 198/621; 198/775; 101/38 A

[58] Field of Search ..................... 101/38 R, 38 A, 39, 101/40, 126; 198/775, 776, 621, 339

[56] References Cited

U.S. PATENT DOCUMENTS

| | | | |
|---|---|---|---|
| 3,024,894 | 3/1962 | Aldrin | 198/775 X |
| 3,164,946 | 1/1965 | DuBuis et al. | 198/776 X |
| 3,874,289 | 4/1975 | Valentin | 101/39 X |
| 4,276,979 | 7/1981 | Buschmann | 198/775 |

FOREIGN PATENT DOCUMENTS

| | | | |
|---|---|---|---|
| 2417373 | 10/1974 | Fed. Rep. of Germany | 101/38 A |
| 2530360 | 1/1977 | Fed. Rep. of Germany | 101/38 R |

*Primary Examiner*—Clifford D. Crowder
*Attorney, Agent, or Firm*—Brisebois & Kruger

[57] ABSTRACT

A high productivity feed device comprising means 28, 29 for supporting objects 3 directed towards the corresponding printing machine and members 30, 35, 350 for gripping said objects, and which are coupled by way of a swinging linkage 22, 24 connected to the main printing machine drive, such that they are subjected to two reciprocating rectilinear movements in phase opposition along the object transfer direction.

Downstream of said support and gripping member means there is disposed an element comprising two swinging arms on a horizontal shaft 53, on which loading means 58 and unloading means 56 for the printing machine are rotatably mounted at the respective ends.

The device according to the invention is arranged to feed cylindrical objects of circular, elliptical or other cross-section to silk-screen printing machines in general.

3 Claims, 9 Drawing Figures

1
2
4
5
6
7
8
9
10
69
69
71
71
72
73
74

HIGH PRODUCTIVITY DEVICE FOR FEEDING CYLINDRICAL OBJECTS TO SILK-SCREEN PRINTING MACHINES

This invention relates to a device for feeding cylindrical objects at high operating frequency to silk-screen printing machines in general.

Silk-screen printing machines for printing on to objects, for example cylindrical objects, are known to have a particularly high production capacity.

It is however also known that said high production capacity can be only partly utilised at the present time, as there are at the moment no feed units available able to feed a large number of objects to the corresponding printing machines in a determined time.

The operational limits on generally known feed units derive mainly from the high inertia stresses induced by the reciprocating motion of the various parts of said units, and from the stoppage times required for gripping the objects.

Feed devices are known, inter alia, in which the objects are fed stepwise on two stationary support bars, at one end of which there is disposed a flame treatment station, while at the other end the objects are withdrawn for feeding to the printing screen.

The aforesaid operational limits are particularly present in this type of known feed unit because the spindles which move the objects stepwise along the stationary bars cannot be driven at high frequency, both because of the excessive inertia stresses induced in them and because of the consequent vibrations which are also transmitted to the fixed parts of the unit, with all the drawbacks that this implies.

Finally, in such known units, the same drawbacks are encountered at the members which collect the objects from the stationary baths in order to feed them to the printing machines, and to simultaneously discharge the same objects after printing.

The main object of the present invention is to provide a feed device which although of simple and rational construction is able to feed objects at a very high rate, so as to completely utilise the production capacity of printing machines, while keeping inertia stresses at acceptable levels.

The concept on which the invention is based is to move both the object support bars and the object gripping members in phase opposition, so that each outward and return stroke of said support bars and gripping members corresponds to one half of the distribution spacing of the notches along the bars.

In this manner, the object transfer speed is doubled without increasing the operating rate or frequency of the moving members.

According to the invention, this is attained by mounting said gripping members and support bars eccentrically, and in diametrically opposing positions, on at least two parallel horizontal shafts which are subjected to reciprocating rotary motion in such a manner as to attain said phase opposition movement for the support bars and gripping members.

In order to accommodate said increased operating capacity, the invention also provides for doubling, on the same drive unit, the elements which load and unload the objects on to and from the corresponding printing machine, said elements operating alternately so as to thus halve the operating speed of the drive unit.

According to the invention this is attained by disposing alternately operating double gripping members at the two ends of a lever which makes rocking movements for raising the object from the bars and depositing it on the spindle, and for withdrawing the printed object from the spindle respectively, each pair of said double gripping members being subjected to swing movements of about 180° so that each member of a given pair operates at a rate equal to half the machine rate.

The constructional characteristics and merits of the invention will be more apparent from the detailed description given hereinafter with reference to the figures of the accompanying drawings which illustrate a particular preferred embodiment of the proposed feed device by way of non-limiting example.

Figure 1:
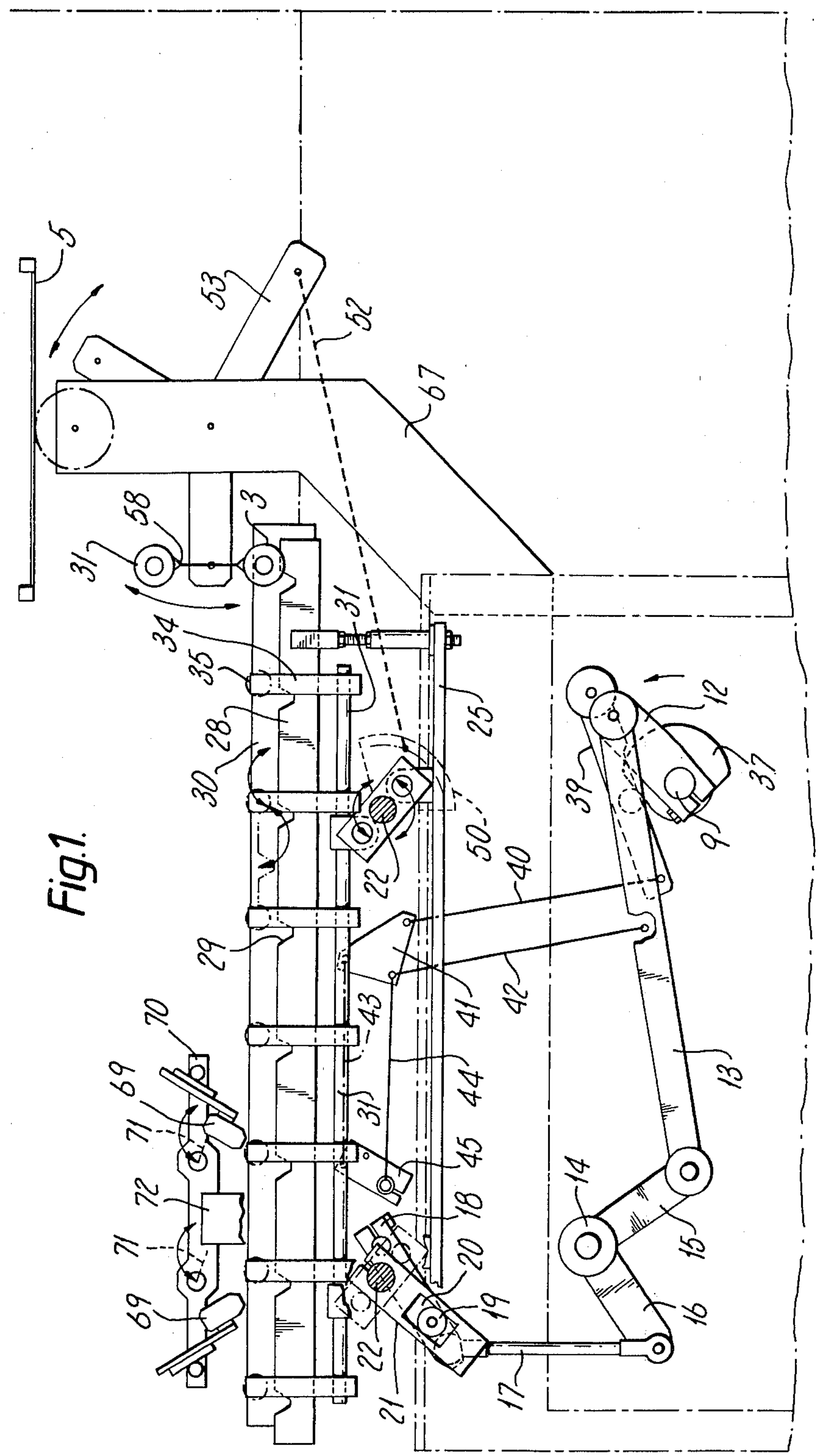
FIG. 1 is a front overall diagrammatic view of the feed device according to the invention.
Figure 2:
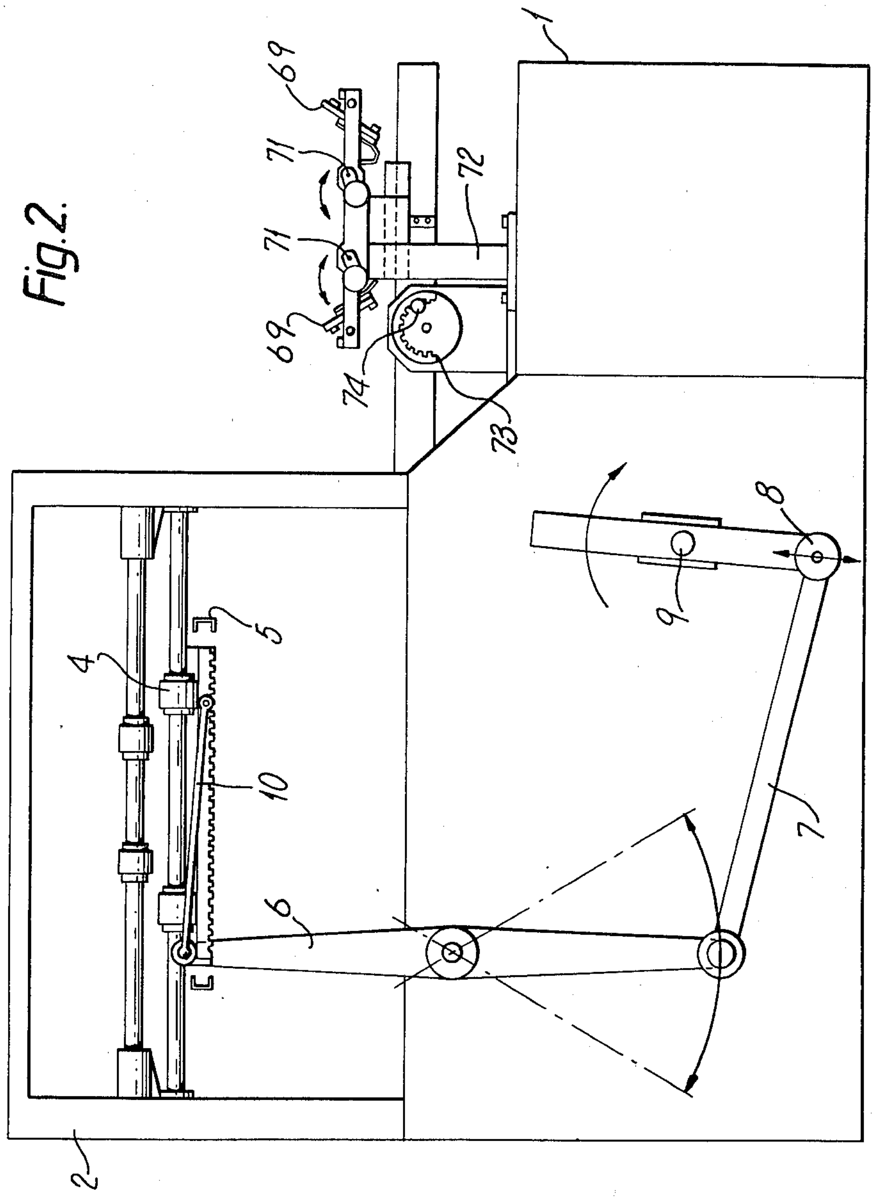
FIG. 2 is a rear diagrammatic view of the invention, which is shown in combination with a silk-screen printing machine.
Figure 3:
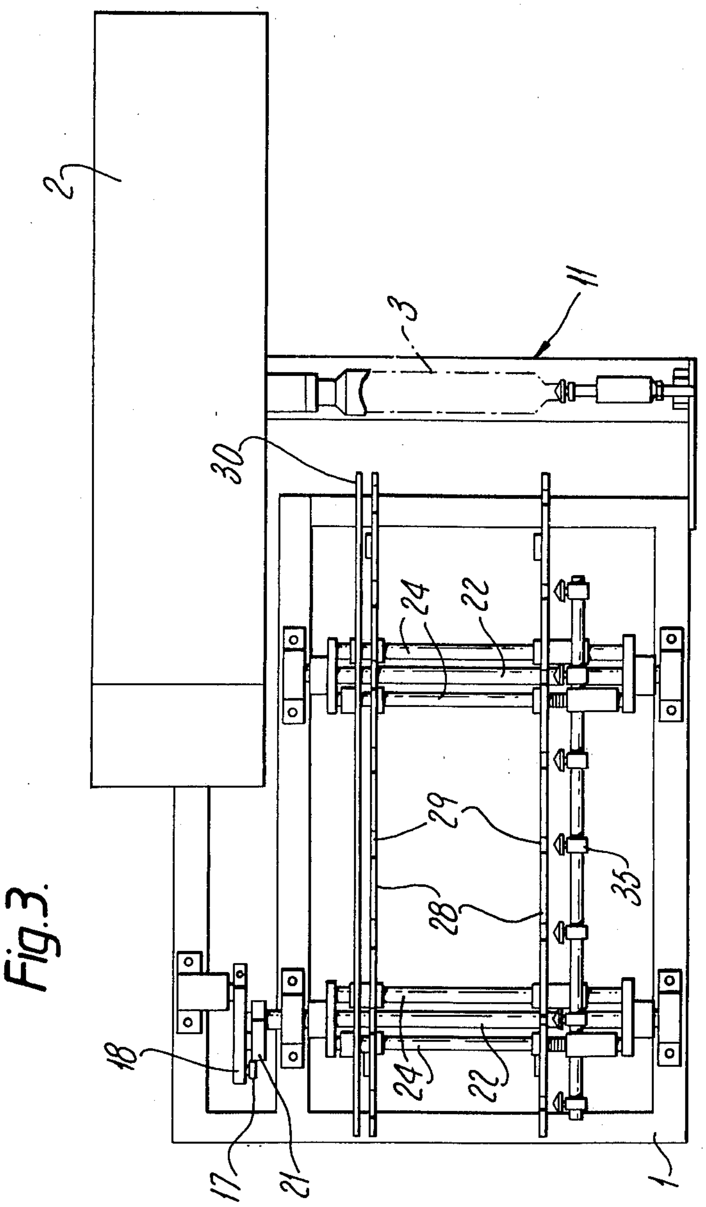
FIG. 3 is a plan projection of the preceding figure.

From said figures, and in particular FIGS. 1, 2 and 3 taken together, it can be seen that the invention comprises a frame 1 which is disposed in proximity to a normal silk-screen machine 2 for printing on to objects 3.

By way of example only, one of these latter is shown in FIG. 3 in the form of a container.

It should be noted that said objects 3 are cylindrical, of circular, elliptical or other cross-section.

The objects are loaded on to the device according to the invention by a machine of known type, not shown.

The printing machine 2 comprises a normal screen support carriage 4 disposed above a normal screen 5 (FIG. 2).

The carriage 4 is driven by an upper connecting rod 10, a rocker arm 6 and a lower connecting rod 7, this latter being pivoted to an eccentric pin 8 of adjustable eccentricity.

The eccentric pin 8 is driven by a horizontal drive shaft 9, from which the motion of the device according to the invention is also derived, as described hereinafter.

With reference to FIG. 3, below the screen 5 there is a working head 11 of known type, the purpose of which is to rotate the objects 3 during the printing stage.

In the front zone of the downstream end of the frame 1 (FIG. 1), the control shaft 9 comprises a crank 12 to which a connecting rod 13 is pivoted and extends towards the upstream or loading end of said frame.

At said upstream end, a horizontal transverse pin 14 is rotatably mounted on the lower part of the frame 1, and from its opposing ends there branch two arms 15 and 16, substantially perpendicular to each other.

Figure 4:
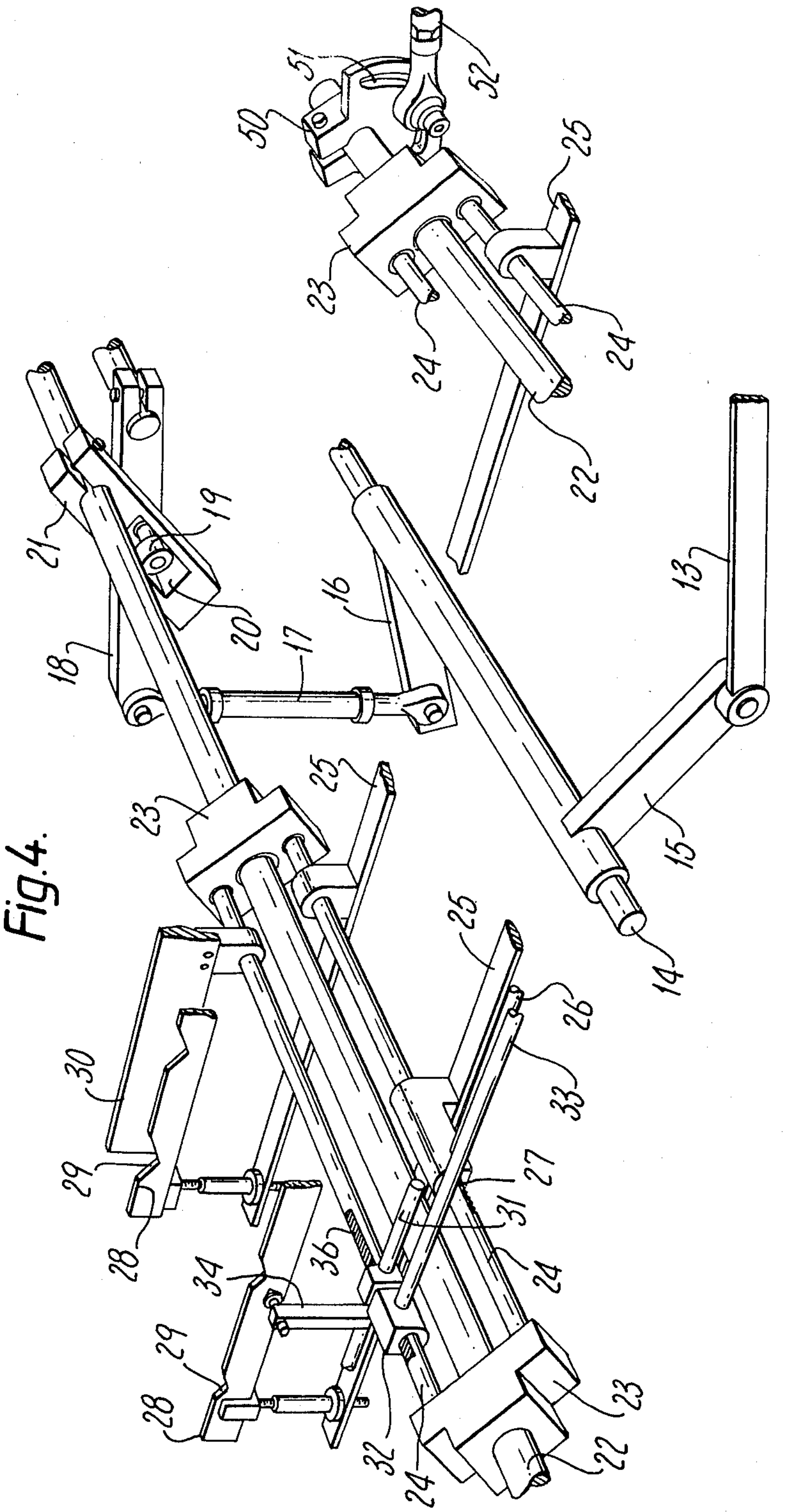
FIG. 4 is a front perspective view of the invention.

The connecting rod 13 is pivoted to the arm 15, which is located in the front zone of the frame 1, while a further connecting rod 17 is pivoted to the arm 16 and extends upwards to connect to a lever 18 pivoted to the frame 1, as also shown in FIG. 4.

An idle roller 19 is provided in an intermediate zone of the lever 18 and slidably inserted in the longitudinal slot 20 of an arm 21, this latter being keyed on to the rear end of a horizontal transverse shaft 22 rotatably mounted on the upstream end of the frame 1.

The shaft 22 is provided with two blocks 23 which support two cylindrical bars 24, these being parallel to each other and to the shaft 22, and being diametrically opposing about this latter.

A shaft entirely similar to the shaft 22 heretofore described is rotatably mounted on the downstream end part of the frame 1, as is apparent from FIGS. 1, 3 and 4.

The two cylindrical bars 24 which in the accompanying FIG. 4 are located to the right of the corresponding shafts 22 are connected together by two longitudinal elements 25 always located below said shafts 22.

The distance between the two longitudinal elements 25 can be adjusted according to the length of the objects 3 by means of an adjustment bar 26 which connects together the two sleeves by which the front longitudinal element 25 is mounted on said two right hand bars 24.

In this respect, inside each individual mounting sleeve, the corresponding free end of the adjustment bar 26 is provided with a toothed wheel which is in constant engagement with toothing 27 on the relative right hand cylindrical bar 24.

Above each longitudinal element 25 and pair of shafts 22 there are disposed two vertical longitudinal plates 28 which can be adjusted in level relative to their own longitudinal support elements 25 by means of suitable threaded columns.

The upper longitudinal edge of each individual plate 28 comprises a set of equidistantly spaced notches or seats 29 for receiving the corresponding ends of the objects 3.

The two cylindrical bars 24 which in FIG. 4 are located to the left of the corresponding shafts 22 are connected together at their rear by a backing plate 30 which is disposed parallel to and on the outer side of the rear plate 28.

Two sleeves 32 are mounted on the front ends of said left hand cylindrical bars 24, and are connected together by an adjustment bar 33.

In this respect, each end of this latter comprises, inside the relative sleeve 32, a toothed wheel which engages with corresponding toothing 36 on the left hand bar 24.

A shaft 31 disposed parallel to and on the outside of the front plate 25 is rotatably mounted on the two sleeves 32, and from it there branches a set of orthogonal arms 34 one less in number than the number of seats 29 in each plate 28.

Each arm 34 is upperly provided with a counter-point 35, which is mounted on a resilient support.

Figure 7:
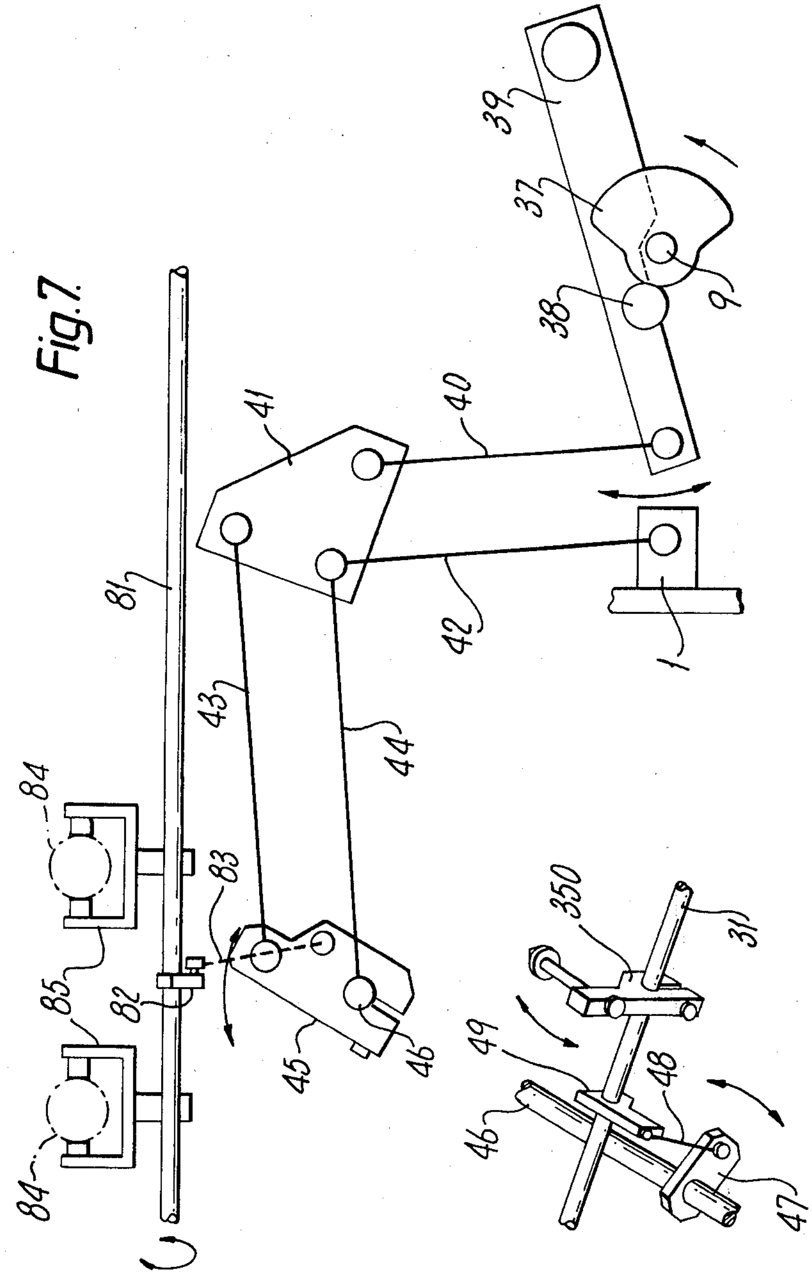
FIG. 7 shows the linkage proposed for controlling the opening and closure of the gripping members of the device according to the invention.

As can be better seen in FIGS. 1 and 7, the rear end of the drive shaft 9 carries, keyed thereon, a conveniently profiled cam 37, the contour of which is constantly contacted by an idle roller 38 centrally mounted on a lever 39, the opposing ends of which are hinged to the frame 1 and to a connecting rod 40 respectively.

The other end of this latter is hinged to a vertex of a triangular plate 41, two further practically horizontal connecting rods 43 and 44 being pivoted to the remaining vertices.

Practically parallel to the connecting rod 40 there is provided a further connecting rod 42, of which the lower end is hinged to the frame 1 and the upper end is hinged to the triangular plate 41 where the connecting rod 44 is pivoted.

This latter is also hinged to a transverse shaft 46 rotatably mounted below the shaft 31 and backing plate 30, with which it swings rigidly in a longitudinal direction relative to the frame 1.

On the rear end of the transverse shaft 46 there is keyed a plate 46, to the upper end of which is pivoted the connecting rod 43.

It will now be apparent that the four connecting rods 40, 42, 43, 44 and the triangular plate 41 define a deformable structure of pantograph type.

As can be better seen from the lower left hand part of FIG. 7, the front end of the transverse shaft 46 is provided with an orthogonal lever 47, from which there branches a connecting rod 48 hinged to an orthogonal appendix 49 which is rigid with the shaft 31.

The two hinging points of the connecting rod 48 are constituted by two suitable ball joints.

As can be seen in FIGS. 1, 4, 5 and 6, a profiled plate 50 is torsionally connected to the rear end of the downstream shaft 22, and is provided with an arcuate slot 51 in which a pin, to which the upstream end of a connecting rod 52 is hinged, is locked in such a manner that it can be adjusted.

Figure 5:
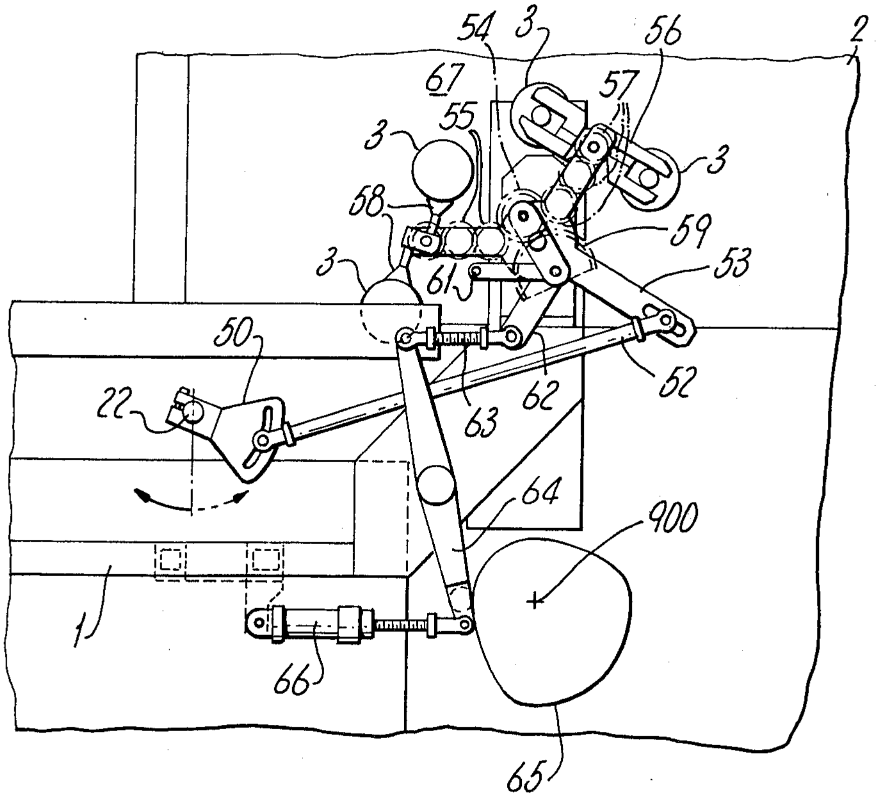
FIG. 5 is a front view of the downstream end of the invention.

The connecting rod 52 extends under the screen 5 and is hinged to the end of the lower arm of a three arm cross 53, which is centrally pivoted on two uprights 67 rising from the downstream end of the frame 1 (FIG. 5).

Figure 6:
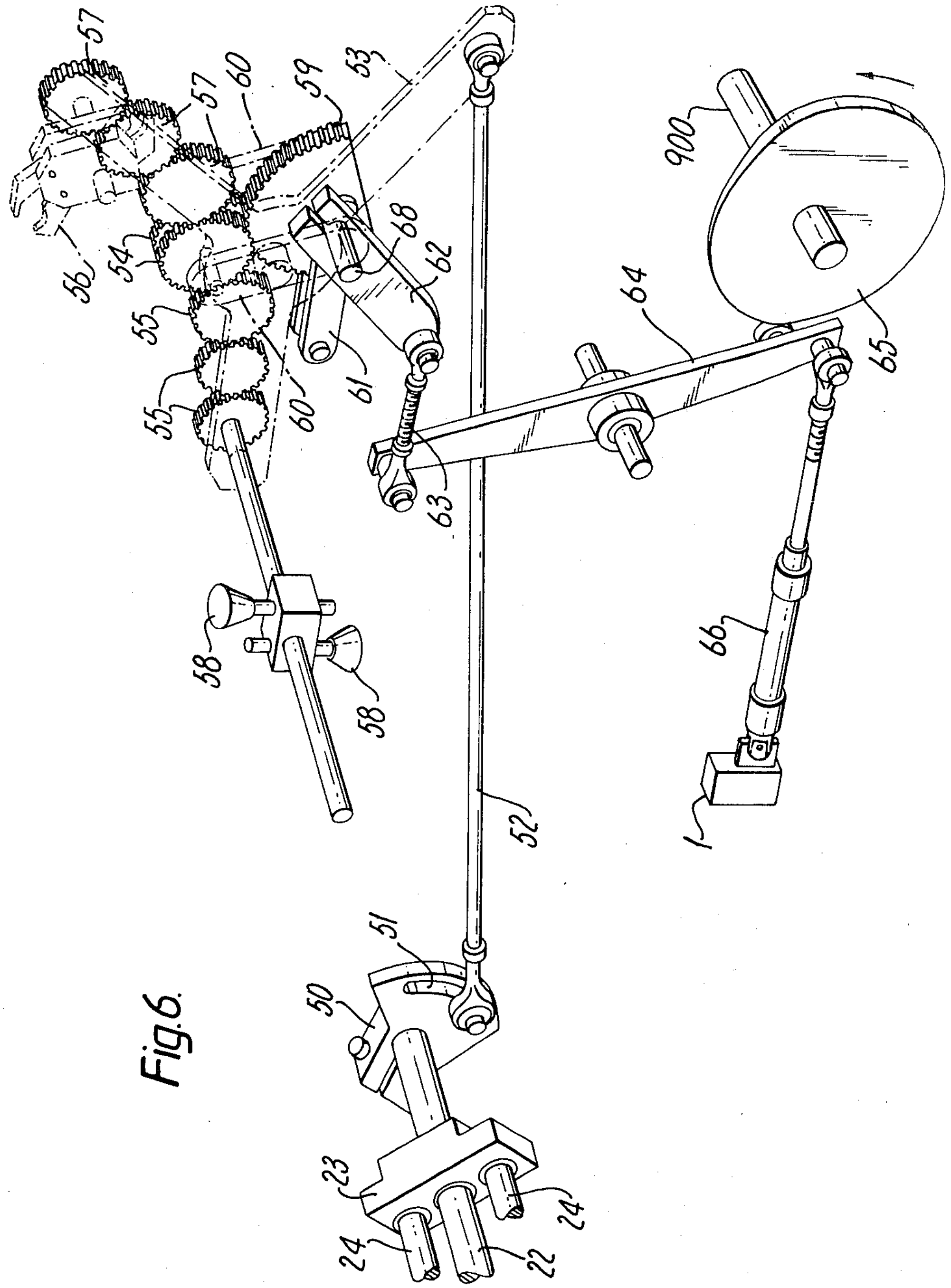
FIG. 6 is a perspective view of the same downstream end.

From FIG. 6 it can be seen that a pin, on which two gear wheels 54 having the same pitch circle diameter are keyed, is mounted laterally to the axis of rotation of the cross 53.

The first gears of two trains of three mutually engaging gears, 55 and 57 respectively, engage with the front gear wheel 54, while a toothed sector 59, the purpose of which will be explained hereinafter, engages with the rear gear wheel 54.

The two aforesaid gear trains are analogous, and are rotatably mounted on the two cross arms which are different from the arm to which the connecting rod 52 is pivoted.

On the keying shaft of the last gear of the first gear train 55 there is keyed a double gripper 56, with pairs of jaws which are diametrically opposed about said shaft, and which is controlled by means of a small double acting pneumatic cylinder-piston unit, not shown.

Two suckers 58 are disposed on the keying shaft of the last gear of the second gear train 57 in diametrically opposing positions about said shaft.

The rear toothed wheel 54 is engaged by the toothed sector 59, the keying shaft 68 of which is located on that side of the axis of rotation of the cross 53 opposite that occupied by the common shaft of the two gear wheels 54.

By means of two first connecting rods 60, the shaft 68 is suspended from the common shaft of the gear wheels 54, two further connecting rods 61 hinged to the frame 1 also being connected to said shaft 68.

From the shaft 68 there branches a lever 62 to which a connecting rod 63 is connected, this latter being controlled by a rocker arm 64 pivoted to the frame 1.

By way of an idle roller, the lower end of the rocker arm 64 is operated by a suitably profiled cam 65, which is keyed on to a shaft 900 controlled by the drive shaft 9.

Contact between said idle roller and cam 65 is ensured by resilient shock absorber means 66 connected lowerly to the rocker arm 64 and pivoted to the frame 1.

As stated, the invention heretofore described is able to feed a large number of cylindrical objects 3 to a silk-screen printing machine 2 in a given time unit.

Because of the fact that in many cases before the printing operation it is known to have to correctly position that zone of the object surface to be printed, the invention is provided, in the transverse downstream zone of the elements 30, 31 and 28 in which the suckers 58 are located when in their lowered position, with a normal positioning or locating device which has not been shown for clarity and simplicity of drawing.

Moreover, because of the fact that before the printing operation it is necessary to "flame treat" the objects 3, especially those of synthetic material, in order to enable them to better receive and retain the printing ink, the invention comprises at its upstream or loading end a "flame treatment" unit provided with a linkage which enables it to operate in perfect synchronism with the gripping members 30, 35 and support members 28 for the objects 3.

Said flame treatment unit is described hereinafter with reference to FIGS. 2, 7, 8 and 9.

Figure 9:
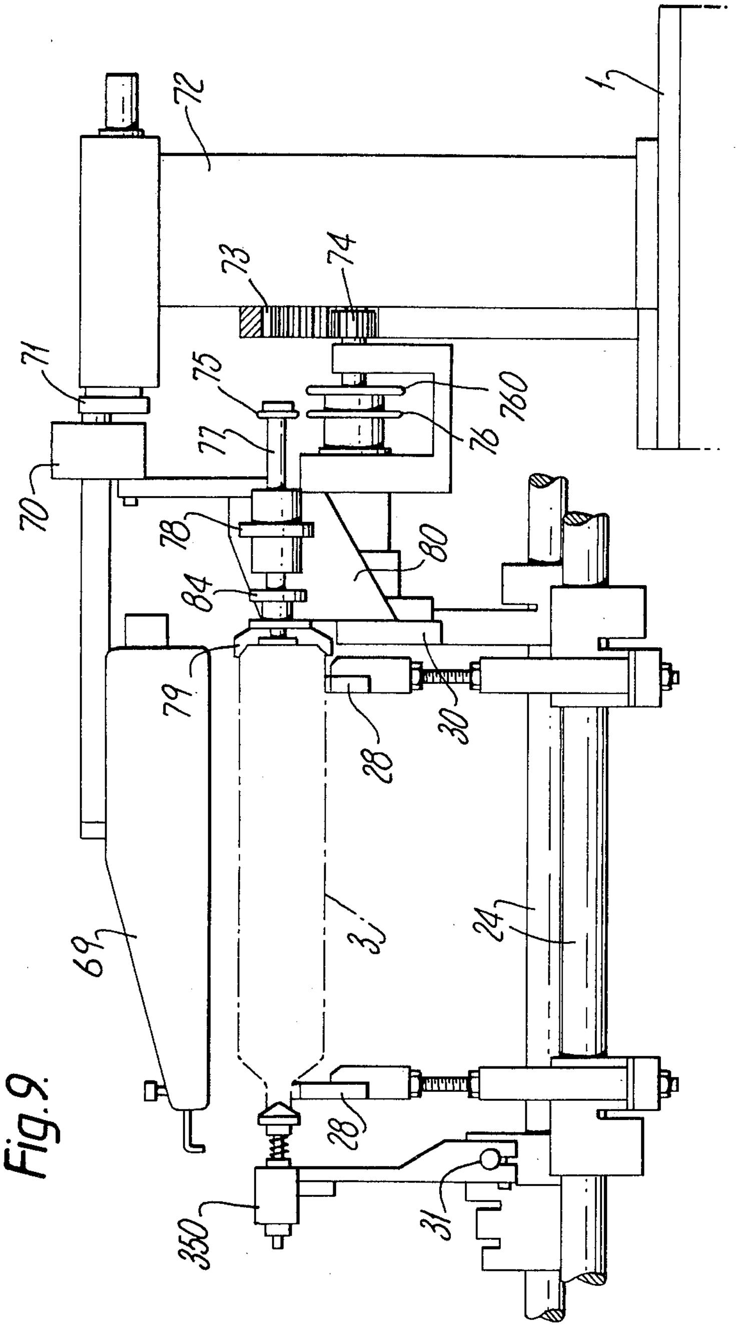

It comprises two normal flame treatment heads 69 as shown in FIG. 9, which are rigid with a horizontal longitudinal bar 70.

The bar 70 is hinged to the top of a column 72 by means of two cranks 71, the eccentricity of these latter being equal to that existing between a cylindrical bar 24 and the corresponding shaft 22.

The bar 70 is rigidly connected to an underlying support 80 branching from the backing plate 30.

To said support 80 there are connected two sleeves 78 in which are rotatably mounted two shafts 77, of which the front end is provided with a breech member 79 and the rear end is provided with a toothed wheel 75.

Each breech member 79 is torsionally restrained to the relative shaft 77, but can slide axially thereon.

For this purpose, each breech member is provided at its rear with a monolithic bush 84 splined on its outer circumference and to which there is connected a fork 85.

Figure 8:
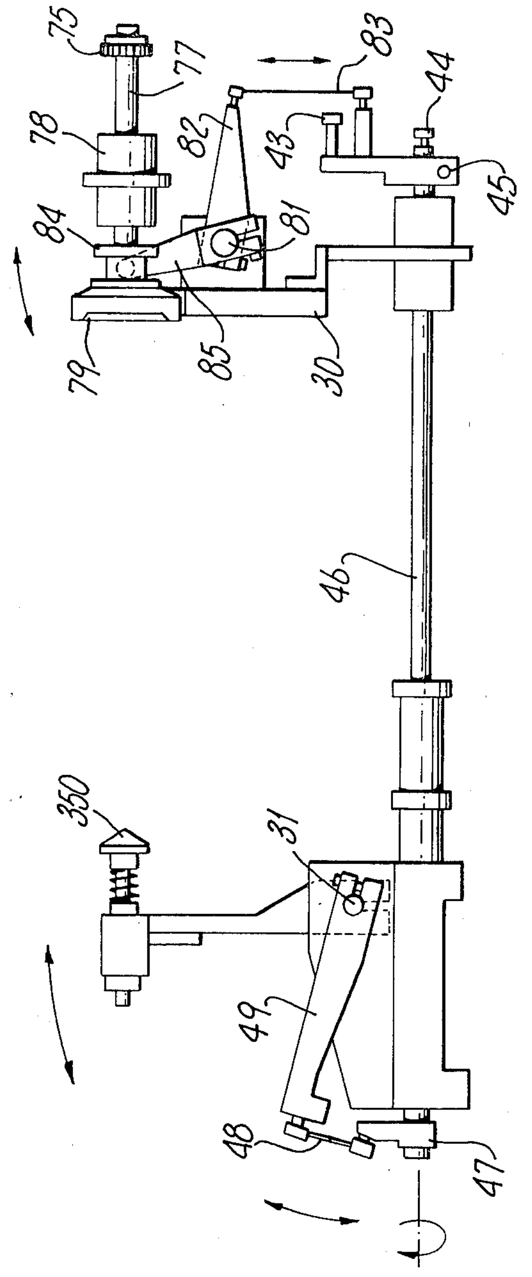
FIGS. 8 and 9 are two cross-sections showing the control linkages provided at the flame treatment station of the invention.

The two forks 85 are rigid with an underlying longitudinal shaft 81 mounted to rotate relative to the backing plate 30, as better seen in FIGS. 7, 8 and 9.

From the shaft 81 there also branches a lever 82 which is connected by a connecting rod 83 to an intermediate point on the plate 45 (FIGS. 1, 7 and 8).

The two hinging points of the connecting rod 83 are constituted by two convenient ball joints.

In the accompanying FIG. 7, the shaft 81 is prolonged towards the right, i.e. towards the downstream end of the invention, to signify that it is engaged in order to control the sliding of the breech member of the aforesaid positioning or locating unit.

A suitable chain, not shown, winds around the two toothed wheels 75, and passes over a ring gear 76 keyed on a rotatable shaft, this latter mounted on the support 80.

The rear end of said rotatable shaft has keyed thereon a toothed wheel 74 which engages with a ring gear sector 73 with internal toothing, which is supported by the frame 1 (FIGS. 2 and 9).

The motion of rotating the breech member of said positioning unit is derived from a further toothed wheel 760 which is keyed on to said rotatable shaft, as shown in FIG. 9.

Three rotatable or idle counter-points 350 are disposed on the shaft 31 between said set of counter-points 35, and in a position corresponding with the breech members 79 and the breech member of said positioning unit.

Finally, in positions corresponding with said three breech members or spindles, the backing plate 30 is provided with convenient apertures to enable the base of said breech members to pass slightly beyond the active face of the backing plate 30.

The operation of the feed device heretofore described is as follows.

The drive unit of the printing machine 2 rotates the drive shaft 9, which by way of the elements 8, 7, 6 and 10, drives the screen support carriage 4 (FIG. 2).

The working head 11 is also operated in known manner (FIG. 3).

The motion for the two shafts 22 and the corresponding cylindrical bars 24 is derived from said shaft 9 by way of the elements 12, 13, 15, 16, 17, 18, 19 and 21, as shown in FIG. 1.

When the plates 28 are completely retracted and the elements 30 and 31 are completely advanced, an object 3, which in this case is constituted by a small bottle, is loaded by a normal loading unit into the first of the two free notches or seats 29 in the plates 28.

In the same configuration, by means of the pantograph device 40-44, the shafts 31 and 81 are swung outwards so that the counter-points 35 and 350 and the breech members of the flame treatment unit and positioning unit are no longer in contact with the opposing edges of the objects 3 which rest in the seats 29 of the plates 28.

When the shafts 22 begin to rotate in a left hand direction, the shafts 31 and 81 remain swung outwards, while the plates 28 advance and the elements 30, 35 and 350 retract.

More precisely, each point of said plates and elements travels through a circumferential arc, the horizontal displacement of which corresponds to one half the distance between two adjacent seats 29.

In this manner, each counter-point 35 or 350 moves from a seat 29 with which it was previously associated, towards the immediately upstream seat 29 which at the same time is transferred towards said counter-point 35 or 350.

At the end of said left hand rotation of the shafts 22, the counter-points 35 and 350 are perfectly aligned with the objects 3 supported by the plates 28, and when said shafts 22 reverse their direction of rotation, the shafts 31 and 81 are swung inwards by the connecting rods 48 and 83, these latter being controlled by the pantograph device.

In this manner, three objects 3 are clamped between the rotatable counter-points 350 and the breech members of the flame treatment and positioning devices, while the other objects are locked against the backing plate 30 by the counter-points 35.

The shafts 22 begin to rotate in a right hand direction, so that the elements 30 and 31 and the plates 28 move in the opposite direction to that described heretofore.

Consequently, each object is raised from the two seats 29 which it previously occupied, and at the end of said right hand rotation is deposited into the two immediately downstream seats 29 because the shafts 31 and 81 again swing outwards.

The working cycle is then repeated as heretofore described.

Thus, during the reciprocating rotary movement of the shafts 22, the elements 30, 31 and the plates 28 are subjected to two opposite reciprocating movements over circumferential arc paths, so as to define an overall movement of the hand-to-hand type.

When the objects 3 are contacted by the counterpoints 350, the transfer motion of the flame treatment or heating heads follows the two underlying objects which are heated over their entire outer surface as they are rotated by the elements 73, 74, 76, 75, 77 and 79.

When the plates 28 are just about to reach their point of maximum advancement, as shown in FIG. 1, the cross 53 is rotated in a left hand direction by the connecting rod 52 so as to lower the empty sucker 58 on to the object 3 which rests on the two downstream end seats 29.

During the left hand rotation of the cross 53, the two free (open) jaws of the double gripper 56 are moved below the screen 5 so that they grip the object 3 which has just been printed.

It should be noted that during the operation of the invention, the double sucker 58 and double gripper 56 each supports two objects 3, namely during the loading stage and during the unloading stage of the printing machine respectively, i.e. during the right hand rotation of the cross 53.

When said right hand rotation of the cross 53 commences, and for the entire duration of this rotation, the toothed sector 59 does not rotate because the idle roller of the rocker arm 64 (FIG. 5) is in contact with a portion of the cam 65 which has a constant radius of curvature.

In this manner, the two gear trains 55 and 57, which rotate together with the cross 53, undergo a short arc in which their component gears are engaged, so that the double sucker and double gripper occupy practically the same positions relative to the cross 53.

At the end of the right hand rotation of this latter, the object which is retained by the upper sucker 58 is gripped by the working head 11 of the printing machine 2, whereas the two lower jaws of the double gripper 56 open so that the released object is conveyed towards subsequent working stations.

During the subsequent left hand rotation of the cross 53, the toothed sector 59 is also rotated by the cam 65 as can be better seen in FIGS. 5 and 6, so that the double gripper 56 and double sucker 58 rotate substantially through 180° relative to the cross.

The operating cycle of the downstream zone of the invention then continues in the manner heretofore described.

It should be finally noted that during the left hand rotational movements of the cross 53, the corresponding 180° rotational movements of the double sucker 58 and double gripper 56 relative to the cross take place alternately in one direction and in the opposite direction, this being due to the particular configuration of the cam 65 (FIGS. 5 and 6).

The invention is not limited to the single embodiment heretofore described, and modifications and improvements can be made thereto without leaving the scope of the invention, the fundamental characteristics of which are summarised in the following claims.

I claim:

1. A high speed device for feeding cylindrical objects to silk screen printing machines comprising two parallel bars having a plurality of aligned equidistantly spaced notches for supporting said objects therebetween, gripping means for simultaneously gripping a plurality of the objects and moving the objects from a first pair of notches forwardly toward an adjacent pair of notches, means for reciprocating the two bars in phase opposition to the gripping means so that the bars move rearwardly as the gripping means move forwardly with the objects, and the bars move forwardly as the gripping means move rearwardly, means for releasing said gripping means to release said objects prior to rearward motion of said gripping means, unloading means for unloading the objects from downstream notches of the bars and for feeding the objects, first to the printing machine, and then to a further conveyor, in timed relation to forward movements of said bars, said unloading means comprising double suction gripping means and additional gripping means for receiving said objects from the double suction gripping means, and means for moving said suction gripping means and said additional gripping means in timed relation to each other.

2. Device according to claim 1 wherein said double suction means comprises first and second oppositely facing gripping means on a common shaft for alternately gripping successive objects from said bars.

3. Device according to claim 2 further comprising means for driving the additional gripping means in timed relation to the printing machine.

* * * * *